United States Patent [19]

Doud

[11] Patent Number: 4,659,357
[45] Date of Patent: Apr. 21, 1987

[54] FAN AIR COOLING OF NECK RING AND PARISON MOLD

[75] Inventor: Wilbur O. Doud, Muncie, Ind.

[73] Assignee: Ball Corporation, Muncie, Ind.

[21] Appl. No.: 778,934

[22] Filed: Sep. 23, 1985

[51] Int. Cl.$^4$ .............................................. C03B 9/38
[52] U.S. Cl. ......................................... 65/83; 65/319; 65/356
[58] Field of Search .................... 65/83, 85, 319, 356

[56] References Cited

U.S. PATENT DOCUMENTS

| | | | |
|---|---|---|---|
| 3,094,404 | 6/1963 | Lauck | 65/356 X |
| 3,849,101 | 11/1974 | Wythe et al. | 65/356 X |
| 4,033,744 | 7/1977 | Davis | 65/319 X |
| 4,251,253 | 2/1981 | Becker et al. | 65/319 X |
| 4,502,879 | 3/1985 | Foster | 65/356 X |

Primary Examiner—Arthur Kellogg
Attorney, Agent, or Firm—Gilbert E. Alberding

[57] ABSTRACT

Apparatus and method are provided for cooling the neck ring (26) and the parison mold (22) of the parison molding portion (20) of an individual section (162) of a glassware molding machine (164) by the use of fan air which is provided to the section box (166) by a motorized fan (300+302) and a fan box (298). The apparatus includes a damper valve (64) with a rotary actuator (82) for selectively controlling flow of fan air to the neck ring (26) and the parison mold (22); and the apparatus includes an isolation sleeve (146) and a temperature controlled valve (170) for utilizing the thermal energy of air discharged from cooling passages (122 and 124) in the parison plunger (116), and for automatically controlling the temperature of the fan air in the section box (166) regardless of ambient air temperatures.

14 Claims, 8 Drawing Figures

FAN AIR COOLING OF NECK RING AND PARISON MOLD

TECHNICAL FIELD

The present invention relates generally to individual section glassware molding machines. More particularly, the present invention relates to a cooling system that utilizes the fan air from the fan box for cooling the neck ring, the finish guide ring, and the parison mold in the portion of an individual section glassware molding machine wherein the parison is formed.

BACKGROUND ART

In the formation of glassware it has been common practice to form a blank, or parison, in a parison molding portion of the glassware molding machine, to automatically transfer the parison to a blow molding portion of the glassware molding machine, and then to blow mold the parison into conformity to a blow mold.

In the parison molding portion of the glassware molding machine, a gob of molten glass is deposited into the parison mold; and a parison plunger is pressed into the parison mold, forcing the gob of glass into a parison that has the combined shape of the neck ring, the finish guide ring, the parison mold, and the parison plunger.

The parison mold portion of the glassware molding machine includes a neck ring that is constructed of two neck ring halves, and that forms the finish portion, or threaded neck, of the parison.

It is this finish portion, or threaded neck, of the parison that is used in the blow molding portion of the glassware molding machine to hold the parison as the parison is blow molded to the final configuration of the glassware; and this same finish portion becomes the threaded neck of the completed container.

Since the finish portion, or threaded neck, of the parison is used to hold the parison for blow molding, the finish portion must be cool enough to have the physical properties that will enable it to withstand the blow molding process and still retain dimensional integrity for the completed container; and yet, the temperature of the parison must be sufficiently high to provide a viscosity that will blow mold.

Thus, it has been a problem to provide cooling for the neck ring that will provide mechanical strength and dimensional integrity in the finish portion of the parison while maintaining the remainder of the parison at a temperature that is sufficiently high to allow blow molding.

For a number of years the prior art has dealt with sundry means for cooling various components that mold glassware. The current state of art may best be shown, for example, in U.S. Pat. No. 3,024,671 by Abbott et al., in which internal cooling means is provided for glass molding surfaces. Although the patent discloses that cooling air currents may be used by allowing their passage through various components including ring arms, it has been found in actual practice that such methods fall short in providing an effective cooling process.

Also related to the subject invention is U.S. Pat. No. 3,015,911 to Payne, the patent disclosing a particular cooling scheme for forming neck finishes on glass containers. However, this patent deals with the blow molding side and does not deal with the blank or parison side of the glass forming operation.

The art for dealing with the problem of adequately cooling the neck ring for parison mold has been advanced by patent applications Ser. No. 06/683,450 filed Dec. 19, 1984, and Ser. No. 06/719,381 filed Apr. 2, 1985, of common assignee.

In the aforesaid patent application of common inventorship entity and common assignee, compressed air is forced through a plurality of vertically disposed and circumferentially spaced holes in the neck ring, in the finish ring, and in the parison mold.

Typically, a glassware molding machine will include six or more sections; and each section includes a section box, a parison mold portion that is disposed above the section box, and a blow mold portion that also is disposed above the section box.

It has been common practice to provide a supply of air to each section box. The source of this air has been a large centrifugal blower, or fan, and an electric motor. Typically one such motorized fan has supplied air to a fan box or duct; and this fan box has supplied air to each section box.

Air in the section boxes has been used to provide cooling for the external surfaces of the blow mold, the parison mold, and the neck ring. In addition the air in the section box has been exhausted through a perforated dead plate. Optionally, there may be provided an overhead cooling means positioned above each blow mold for directing supplemental cooling air to the containers as well as to the neck rings and each blow mold. Glassware that is removed from the blow molding section of the glassware molding machine is placed on the dead plate immediately upon being removed from the blow mold and receives initial cooling thereupon by the flow of fan air from the section box.

The present patent application advances the art of molding glassware by providing apparatus and method for cooling the neck ring, the finish ring, and the parison mold by use of this fan air that is provided to the fan box, and to each section box, by a motorized fan.

By utilizing fan air from the section box for cooling the neck ring and the parison mold, the expense of providing compresssed air for these cooling functions is eliminated. This reduction in cost includes both the cost of electrical power, which has become a significant cost factor in producing glassware of recent years, and the cost of providing and of maintaining an air compressor.

In addition, in a preferred embodiment and method, the present invention utilizes air being exhausted from cooling passages in the parison plunger to control the temperature of the air in the section box.

It is a principal object of the present invention to provide apparatus and method for using fan air from the section box of an individual section glassware molding machine for cooling the neck ring, the finish ring, and the parison mold.

It is an object to provide apparatus and method for controlling the flow of fan air through the neck ring, finish ring, and parison mold, and thereby to provide optimum cooling and to achieve an increase in productivity.

It is an object of the present invention to reduce the cost of molding glassware by utilizing air presently available for cooling processes formerly achieved only at the expense of providing compressed air.

It is another object of the present invention to reduce national dependence upon imported oil by reducing the energy requirements of glassware molding operations.

It is a further object of the present invention to provide means for separating cooling air that is exhausting from the parison plunger from fan air that is being supplied to the neck ring from the section box.

It is still a further object to control the temperature of fan air so that consistent cooling of the neck ring, the finish ring, and the parison mold are achieved regardless of changes in ambient temperature.

Finally, it is an object of the present invention to utilize the thermal energy of air being exhausted from the parison plunger for maintaining fan air in the section box at a substantially constant temperature regardless of changes in the ambient temperature.

DISCLOSURE OF INVENTION

In the present invention, a parison molding portion of an individual glassware molding machine includes a parison mold that may consist of a pair of mold halves and that forms the greater portion of the outside contour of the parison, a split neck ring that consists of a pair of neck ring halves and that forms the finish, or threaded neck, of the parison, a finish guide ring that is retained in an interior groove of the neck ring halves and that forms the top surface of the threaded neck of the parison, and a parison plunger that forms the interior of the parison.

The neck ring is juxtaposed to an upper receiver cap; and the upper receiver cap is telescopically connected to a lower receiver cap. A circumferential groove in the upper receiver cap opens downwardly and is telescopically closed by the lower receiver cap. The circumferential groove of the upper receiver cap and the lower receiver cap cooperate to form both a pneumatic actuator and a receiver cap manifold for receiving and for distributing cooling air.

The upper receiver cap includes a plurality of cooling holes that are disposed radially outward from the axis of the parison mold, that are circumferentially spaced around the parison mold axis, and that communicate with the receiver cap manifold.

The neck ring includes a plurality of cooling holes that are disposed radially outward from the vertical axis of the parison mold, that are circumferentially spaced around the parison mold axis, and that are spaced to register with respective ones of the cooling holes in the upper receiver cap.

The upper receiver cap is forced upwardly and into contact with the neck ring by air pressure in the receiver cap manifold. Engaging springs (not shown) may be employed to assist this engagement.

The parison mold halves each include a plurality of cooling holes that are vertically disposed, that are circumferentially spaced around the parison mold, and that register with respective ones of the cooling holes in the neck ring when the neck ring halves are closed and held against the parison mold.

The parison mold includes an interior groove that is circumferentially shaped; and, when the mold halves close, this interior groove grasps the neck ring, clamping the neck ring halves together, clamping the neck ring halves against the parison mold, and connecting the cooling holes of the parison mold to respective ones of the cooling holes of the neck ring.

The flow of cooling air is supplied to the receiver cap from fan air that is supplied to each section box of an individual section of the glassware molding machine. The fan air is produced by a motorized fan, or motorized blower, of the centrifugal type, is supplied to a fan box that is disposed beneath a plurality of individual section boxes; and each section box is supplied with fan air from the fan box.

The fan air flows upwardly from the section box through a guide body that is cyclindrically shaped and that is disposed circumferentially around the plunger rod of the parison plunger, flows upwardly past a plurality of circumferentially spaced lugs of the spring adapter portion of the aligning sleeve, flows upwardly through a plurality of holes in the damper body, flows upwardly through a plurality of passages in the valve plate, flows upwardly through holes in the bottom of the lower receiver cap, flows into the receiver cap manifold, and then flows upwardly through holes in the upper receiver cap, the neck ring, and the parison mold, as previously described.

In a preferred configuration, air being exhausted from the parison plunger is separated from the fan air being supplied to the receiver cap and the neck ring. This separation of air flows is achieved by an isolation sleeve that is disposed circumferentially around the plunger rod and radially intermediate of the plunger rod and the guide body.

Preferably, the air being exhausted from the parison plunger is conducted to a temperature controlled mixing valve. The mixing valve selectively utilizes the air that is exhausting from the parison plunger to maintain the fan air in the section box at a substantially constant temperature regardless of the ambient temperature surrounding the motorized fan, thereby achieving consistent cooling of the neck ring and parison mold regardless of changes in the ambient temperature.

In a preferred configuration, the temperature control for the mixing valve consists of a bimetal bellows; and the mixing valve includes a valve spool that is operatively connected to the bimetal bellows.

The flow of fan air through the neck ring, finish ring, and parison mold is as follows:

A portion of the fan air flows upwardly through the cooling holes that are disposed in the parison mold; and this fan air is discharged through a mold baffle (not shown) that is disposed above and juxtaposed to the parison mold.

A remainder of the fan air flows radially outward from the neck ring through a plurality of circumferentially spaced and radially disposed notches in the neck ring, thereby providing additional cooling for the neck ring by engagement with the radially disposed cooling notches and a plurality of radially disposed cooling fins that are formed by, and that are interposed between, the cooling notches.

Thus, the neck ring is cooled by a flow of fan air that flows upwardly through the plurality of vertically disposed and circumferentially spaced cooling holes in the neck ring, and is cooled by a portion of the cooling air flowing radially out through the radially disposed notches; and the remainder of the fan air is directed upwardly through a plurality of vertically disposed and circumferentially spaced cooling holes in the parison mold.

The results are that both the neck ring and the parison mold are cooled by fan air; but the neck ring receives more cooling than the parison mold; so that the finish portion, or threaded neck, of the parison is cooled sufficiently to give mechanical strength and dimensional stability to the finish portion, and the temperature of the remainder of the parison is kept high enough to permit blow molding of the container.

More particularly, the neck ring, the finish ring, and the parison mold are cooled by fan air from the section box, thereby eliminating the cost of providing compressed air for these cooling functions.

Further, means is provided for controlling the temperature of the fan air by utilizing the thermal energy of air being exhausted from the parison plunger, thereby providing consistent cooling of the neck ring, finish ring, and parison mold irrespective of changes in the ambient temperature, and thereby achieving consistency in product quality.

BEST MODE FOR CARRYING OUT THE INVENTION

Referring now to the drawings, in order to prevent undue crowding of part numbers, the part numbers for the recited parts are placed on the views in which a given part is shown in the largest scale or in which the view includes the fewest associated parts. Referring to FIGS. 1-3, 6, and 8, a parison molding portion 20 of an individual section glassware molding machine (shown in part in FIG. 8), includes a parison mold 22 having parison mold halves 24a and 24b, and having a split neck ring 26 that is disposed in a neck ring holder 28. The neck ring holder 28 is shown by phantom lines because the neck ring holder 28 is not a part of the parison molding portion 20.

Figure 1:
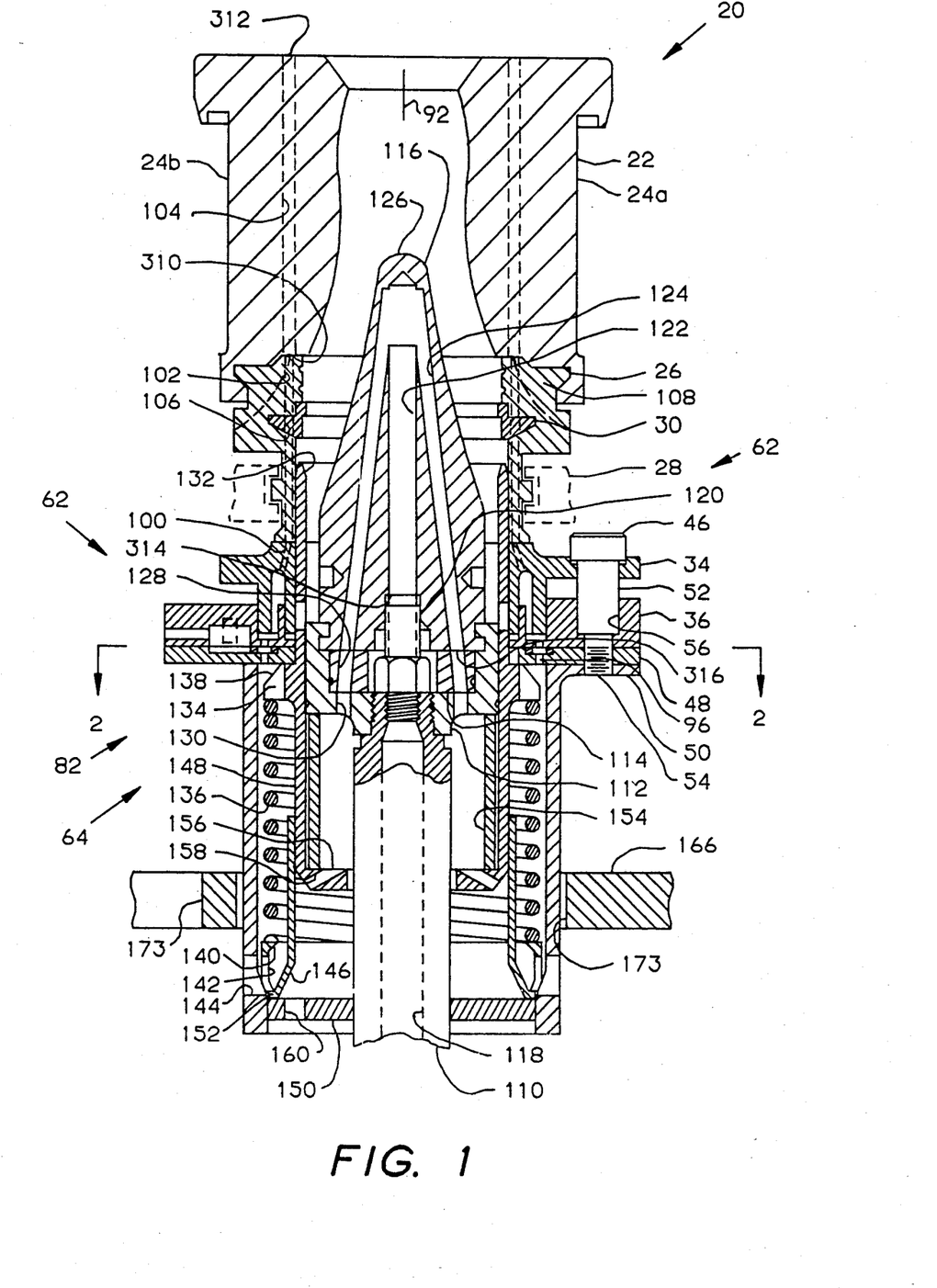
FIG. 1 is a cross sectional elevation of a part of the parison molding portion of an individual section of a glassware molding machine, showing the flow path for fan air from the section box to the neck ring and parison mold, and showing the damper valve that is interposed into the flow path.

The parison molding portion 20 also includes a finish guide ring 30 that is retained in an internal groove 32 in the neck ring 26, an upper receiver cap 34, and a lower receiver cap 36.

Figure 3:
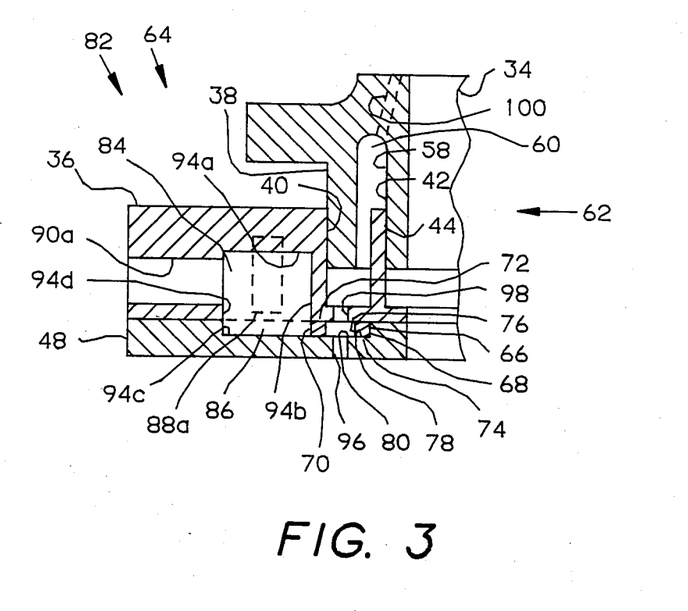
FIG. 3 is a partial cross sectional elevation, taken substantially as shown by section line 3—3 of FIG. 2, showing the damper valve or shutter valve and the rotary actuator of FIG. 2 in an enlarged scale, and showing a partial cross section of the upper receiver cap telescopically fitted into the lower receiver cap.

The upper receiver cap 34 includes an outer pilot 38 that is cylindrically shaped; and the lower receiver cap 36 includes a pilot counterbore 40. The outer pilot 38 is slidably fitted into the pilot counterbore 40. The upper receiver cap 34 also includes an inner pilot 42 that is circumferentially shaped; and the inner pilot 42 telescopically engages an inner bore 44 of the lower receiver cap 36.

The upper receiver cap 34 is rotationally fixed to the lower receiver cap 36, but is allowed limited upward movement by means of a plurality of circumferentially spaced shoulder bolts 46.

The shoulder bolts 46 securely and rigidly attach the lower receiver cap 36 to a damper body 48 and to a guide body 50 by larger shanks 52 engaging the lower receiver cap 36 and by threaded portions 54 engaging the guide body 50. The shoulder bolts 46 rotationally index the upper receiver cap 34 to the lower receiver cap 36 while allowing limited vertical movement of the upper receiver cap 34 by virtue of the length of the larger holes 56.

The upper receiver cap 34 includes a manifold groove 58 that is circumferentially disposed around the upper receiver cap 34. that extends upwardly thereinto, and that cooperates with the lower receiver cap 36 to provide an air manifold, or receiver cap manifold, 60.

Also, the circumferential manifold groove 58 cooperates with the telescoping action of the upper receiver cap 34 and the lower receiver cap 36 to provide an air powered actuator 62 for forcing the upper receiver cap 34 into engagement with the neck ring 26.

Figure 2:
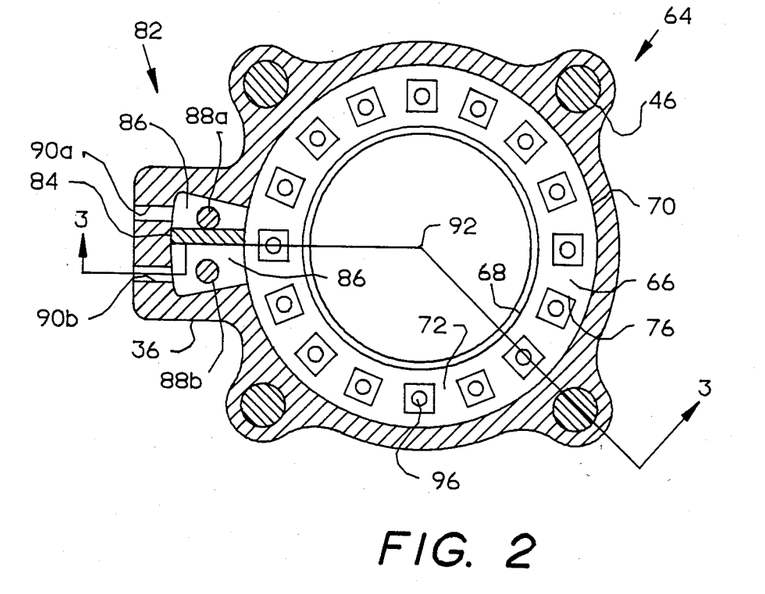
FIG. 2 is a top cross section taken substantially as shown by section line 2—2 of FIG. 1, showing the damper valve and the rotary actuator thereof, and omitting the other parts that are disposed radially inward.

The parison molding portion 20 includes a damper valve or shutter valve 64. The damper valve 64 includes the damper body 48, a valve plate 66, and cooperating portions of the lower receiver cap 36.

The valve plate 66 includes a circular inner surface 68, a circular outer surface 70, a top surface 72, a bottom surface 74, and a plurality of square passages 76 that extend though the valve plate 66 from the top surface 72 to the bottom surface 74.

The valve plate 66 is disposed in a groove 78 of the damper body 48 with the bottom surface 74 thereof juxtaposed against a groove bottom 80 of the groove 78.

The damper valve 64 also includes a rotary actuator 82. The rotary actuator 82 includes a vane 84, an arcuate power chamber 86 that is disposed radially outward from the circular outer surface 70 of the valve plate 66, stop pins 88a and 88b, and ports 90a and 90b. The vane 84 is disposed in the power chamber 86, is arcuately movable around a parison axis 92 by air pressure supplied alternately to the ports 90a and 90b, and is alternately positionable to the position shown in FIG. 2 wherein the vane 84 abuts the stop pin 88a and to another position (not shown) wherein the vane 84 abuts the stop pin 88b.

The circular inner surface 68 and the circular outer surface 70 of the valve plate 66 are both disposed radially outward from the parison axis 92 and are both concentric therewith; and the top surface 72 and the bottom surface 74 of the valve plate 66 are both substantially orthogonal to the parison axis 92.

The arcuate power chamber 86 includes surfaces 94a, 94b, 94c, and 94d, the surface 94a being in the lower receiver cap 36, the surface 94c being in the damper body 48, and the surfaces 94b and 94d being partially in the lower receiver cap 36 and partially in the damper body 48.

The damper body 48 includes a plurality of cooling holes 96 that are disposed substantially parallel to the parison axis 92, that are spaced circumferentially around the parison axis 92, and that register with the square passages 76 when the valve plate 66 is in the position as shown in FIG. 2. Likewise, the lower receiver cap 36 includes a plurality of cooling holes 98 that are spaced circumferentially around the parison axis 92, and that register with the square passages 76 when the valve plate 66 is in the position as shown in FIG. 2.

Figure 6:
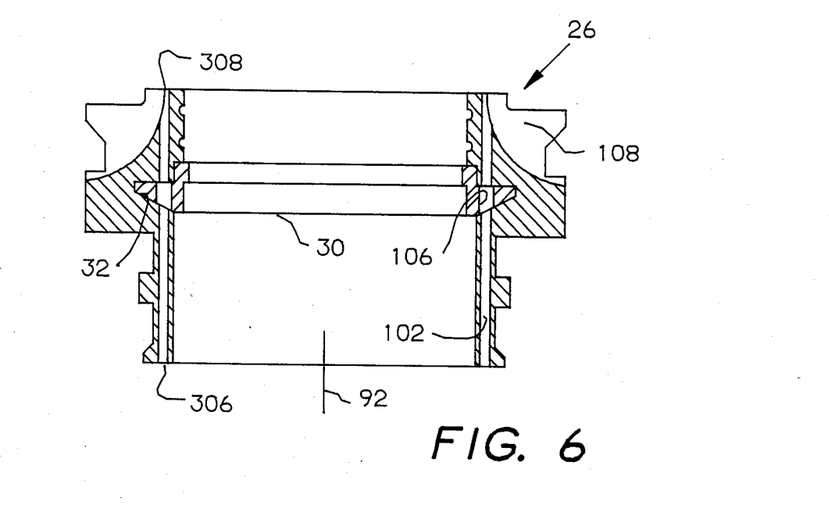
FIG. 6 is a cross sectional elevation of the neck ring and finish guide ring of FIG. 1, taken substantially the same as FIG. 1.

The upper receiver cap 34 includes a plurality of cooling holes 100 that are disposed substantially parallel to the parison axis 92, that are spaced circumferentially around the parison axis 92, and that register with respective ones of similarly disposed and similarly spaced cooling holes 102 in the neck ring 26. In like manner, the cooling holes 102 in the neck ring 26 register with respective ones of similarly disposed and similarly spaced cooling holes 104 in the parison mold 22.

The finish guide ring 30 includes a plurality of cooling passages 106 that are circumferentially spaced around the parison axis 92 and that register with respective ones of the cooling holes 102 in the neck ring 26. Further, the neck ring 26 includes a plurality of radially disposed and circumferentially spaced notches 108 that intercept the cooling holes 102 of the neck ring 26.

Thus, there are a plurality of circumferentially spaced flow paths that extend upwardly from the damper body 48 through the parison mold 22. These flow paths include the cooling holes 96 of the damper body 48, the square passages 76 of the valve plate 66, the cooling holes 98 of the lower receiver cap 36, the manifold groove 58 of the upper receiver cap 34, the cooling holes 100 of the upper receiver cap 34, the cooling holes 102 of the neck ring 26, the cooling passages 106 of the finish guide ring 30, and the cooling holes 104 of the parison mold 22.

Referring now to FIG. 1, the parison molding portion 20 includes a plunger rod 110, a plunger head 112 that is connected to the plunger rod 110, a pressure ring 114 that 1s inserted into the plunger head 112, and a parison plunger 116 that is inserted into the plunger head 112 and that abuts the pressure ring 114.

The parison plunger 116 is cooled by air flow through a longitudinally disposed hole 118 in the plunger rod 110, a tubular fitting 120 that is threaded into the plunger rod 110, a central cooling passage 122 that extends longitudinally upward into the parison plunger 116 and that slidingly receives the tubular fitting 120, a plurality of radially disposed cooling passages 124 that intercept the central cooling passage 122 proximal to a nose 126 of the parison plunger 116 and that extend longitudinally downward and radially outward, a plurality of circumferentially spaced cooling holes 128 in the pressure ring 114 that register with respective ones of the cooling passages 124, and a plurality of circumferentially spaced cooling holes 130 in the plunger head 112 that register with respective ones of the cooling holes 128.

The parison molding portion 20 includes an aligning sleeve 132 that is slidably disposed inside the neck ring 26, the upper receiver cap 34, the lower receiver cap 36, and the damper body 48. The aligning sleeve 132 includes a plurality of circumferentially spaced lugs 134 that abut the damper body 48 and that serve as a spring adapter for a spring 136. The lugs 134 each include a chamfer 138 to facilitate air flow to the cooling holes 96 of the damper body 48.

The spring 136 is retained between the lugs 134 and a spring adapter 140. The spring adapter 140 includes a plurality of circumferentially spaced openings 142 that cooperate with a plurality of radially disposed and circumferentially spaced air passages 144 in the guide body 50 to allow air flow radially into the guide body 50 and upwardly to the cooling holes 96 in the damper body 48.

An isolation sleeve 146 is circumferentially disposed around the plunger rod 110 and is disposed radially intermediate of the plunger rod 110 and the guide body 50. The isolation sleeve 146 telescopically cooperates with a lower portion 148 of the aligning sleeve 132 to isolate cooling air being exhausted from the parison plunger 116 from cooling air being supplied to the neck ring 26 and the parison mold 22 via the damper valve 64.

The spring adapter 140 is retained by a retaining plate 150 that is disposed inside the guide body 50 and that is fixedly secured to the guide body by any suitable means. The isolation sleeve 146 includes a circumferentially disposed foot 152 that is disposed intermediate of the spring adapter 140 and the retaining plate 150, and that prevents the isolation sleeve 146 from moving upwardly.

Finally, the parison molding portion 20 includes a stop sleeve 154 that is disposed inside the lower portion 148 of the aligning sleeve 132 and that cooperates with the plunger head 112 and a flange 156 of the aligning sleeve 132 to compress the spring 136 when the plunger rod 110 moves downwardly below a predetermined position; and the flange 156 includes a plurality of air passages 158 that are circumferentially spaced and that extend both longitudinally downward and radially outward.

Referring now to FIGS. 1–3 and 6, cooling air for the neck ring 26 and the parison mold 22 enters the guide body 50 through the air passages 144, flows radially through respective ones of the openings 142 of the spring adapter 140, flows longitudinally upward between the guide body 50 and the isolation sleeve 146, and flows into the damper valve 64 via the cooling holes 96 of the damper body 48.

Air that has been used for cooling the parison plunger 116 is exhausted from the cooling holes 130 in the plunger head 112 flows longitudinally downward between the plunger rod 110 and the lower portion 148 of the aligning sleeve 132, continues downward between the plunger rod 110 and the isolation sleeve 146, and is exhausted through an air passage 160 in the retaining plate 150.

Thus cooling air being exhausted from the parison plunger 116 is discharged through the air passage 160 of the retaining plate 150 and is isolated from cooling air being supplied to the neck ring 26 and to the parison mold 22 via the air passages 144 of the guide body 50.

Figure 7:
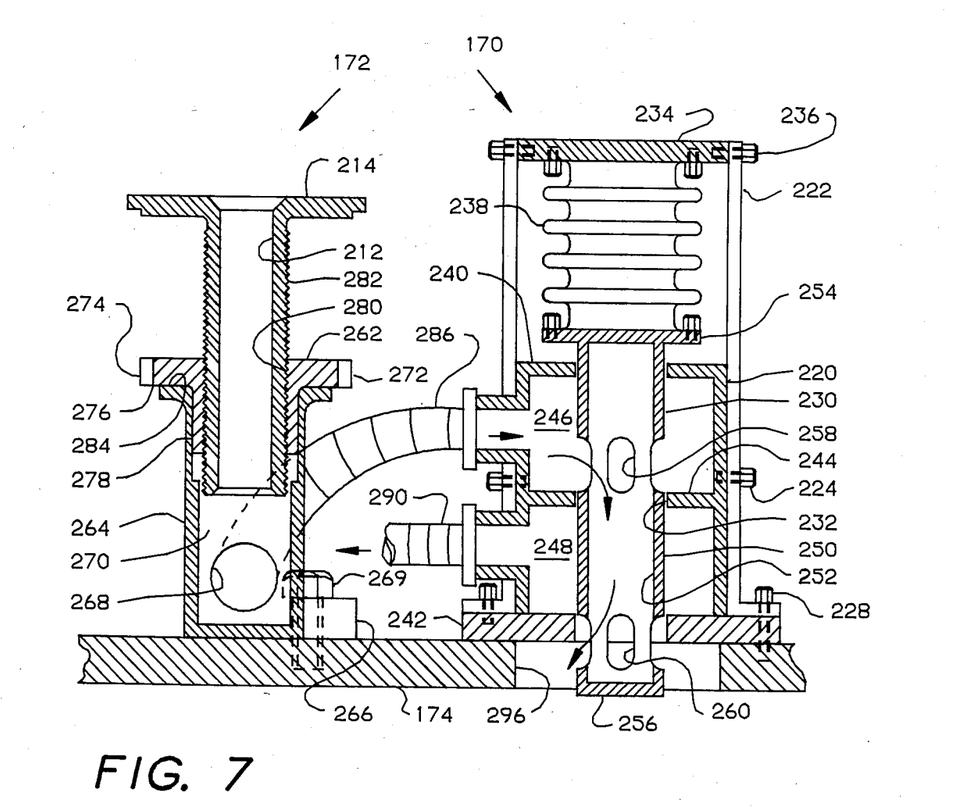
FIG. 7 is a cross sectional elevation of the temperature controlled mixing valve of the present invention, and of the mechanism that connects the mixing valve to the reciprocating actuator of FIG. 4.
Figure 8:
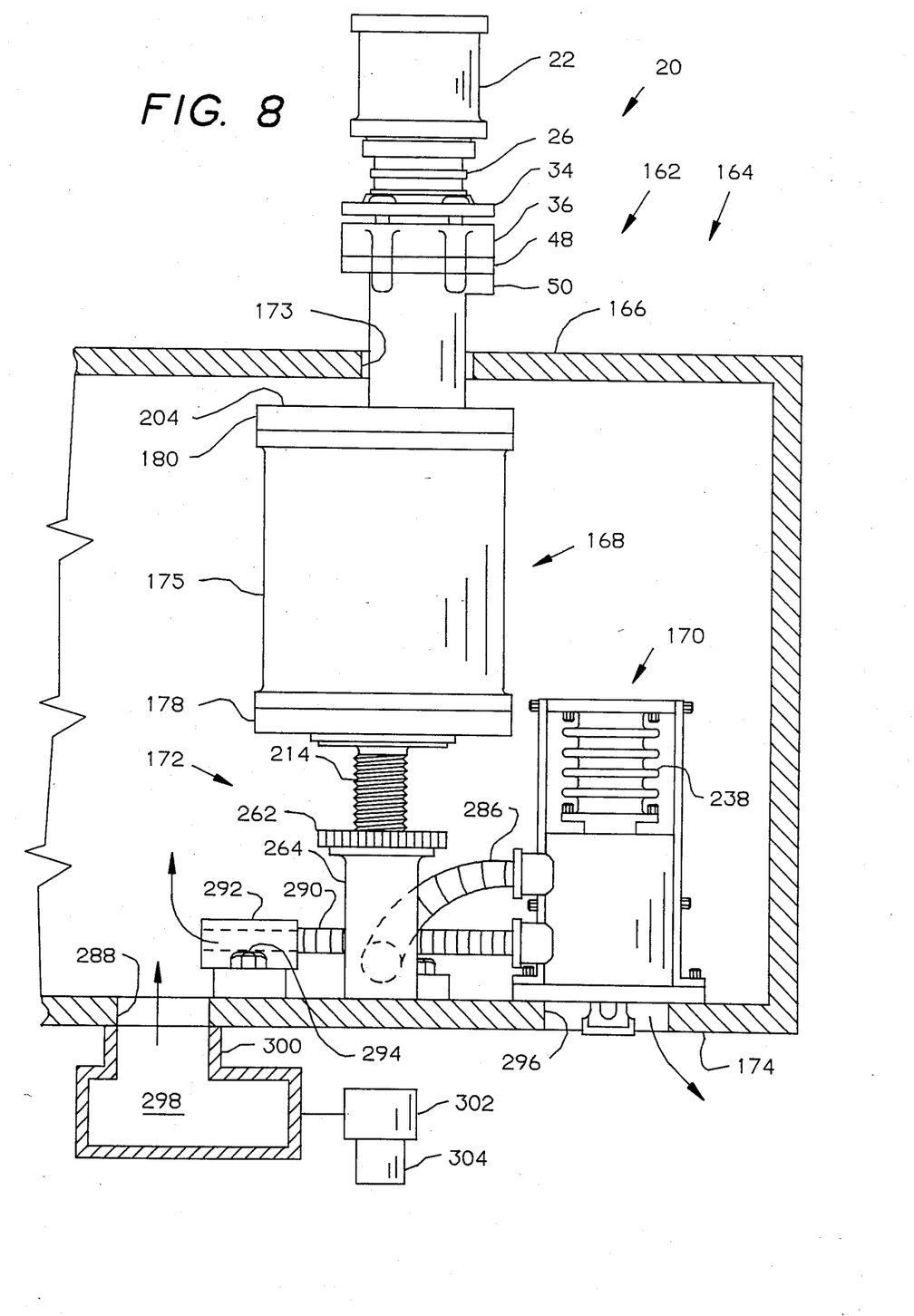
FIG. 8 is a cross sectional elevation of a section box with the mechanisms of FIGS. 1, 4, and 7 assembled thereto, a cross sectional elevation of a fan box shown at a reduced scale, and a schematic representation of a motorized fan.

Referring now to FIGS. 1, 4, 7, and 8, and more particularly to FIG. 8, an individual section 162 of a glassware molding machine 164 includes the parison molding portion 20 and a blow molding section (not shown).

The parison molding portion 20 includes a section box 166, and the mechanism shown in FIG. 1, including the parison mold 22, the neck ring 26, the finish guide ring 30, and the parison plunger 116. In addition, the parison molding portion 20 includes a reciprocating actuator 168 of FIG. 4, a temperature controlled valve 170 of FIG. 7, and a jacking conduit 172 also of FIG. 7.

The guide body 50 of FIG. 1 is inserted through a hole 173 of the section box 166; and both the temperature controlled valve 170 and the jacking conduit 172 are attached to a bottom 174 of the section box 166.

Figure 4:
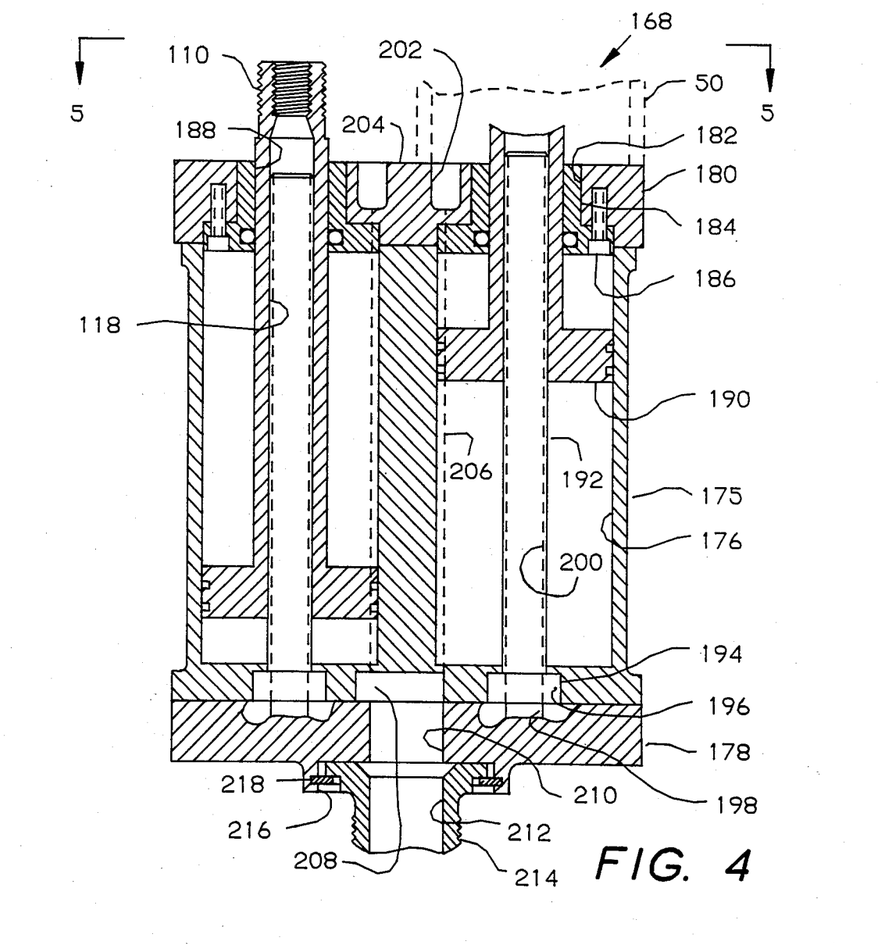
FIG. 4 is a cross sectional elevation showing a typical reciprocating actuator of the prior art type that includes two pneumatic cylinders and that is used with glassware molding machines of the type in which two parisons are formed in a single parison molding cycle, showing the flow path for air that is exhausted from the parison plungers, and showing a portion of FIG. 1 juxtaposed against the reciprocating actuator.
Figure 5:
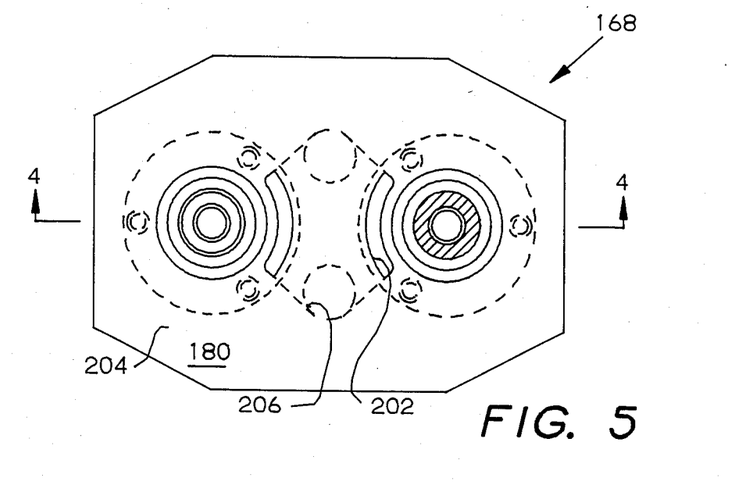
FIG. 5 is a top view of the reciprocating actuator of FIG. 4, taken substantially as shown by view line 5—5 of FIG. 4.

Referring now to FIGS. 4 and 5, the reciprocating actuator 168 is of a configuration that is common to the industry; and the reciprocating actuator 168 is described herein only to the extent that is necessary to the understanding of the present invention.

The reciprocating actuator 168 includes plunger rods 110, one of which was shown and described in part in FIG. 1. Since the reciprocating actuator 168 is of the dual type which includes two of the plunger rods 110, and which provides reciprocating actuation for two parison plungers 116, and which is used to form two parisons (not shown), it is necessary to describe only half of the reciprocating actuator 168 except for those portions which are not duplicated.

The reciprocating actuator 168 includes a cylinder body 175 having cylinder bores 176, a cylinder head 178, and a cylinder cap 180. The cylinder cap 180 is fixedly attached to the cylinder body 175 by any suitable means (not shown). The cylinder cap 180 includes a bearing bore 182; and a flanged sleeve bearing 184 is inserted into the bearing bore 182 and is secured to the cylinder cap 180 by bolts 186.

The plunger rod 110 is inserted into a plunger bore 188 of the flanged sleeve bearing 184; and a piston 190, which is integral with the plunger rod 110, is slidably inserted into the cylinder bore 176.

A tube 192, having an enlarged portion 194, is slidably inserted into the longitudinally disposed hole 118 of the plunger rod 110; and the enlarged portion 194 is retained in a counterbore 196 of the cylinder body 175. Thus, air supplied to a passageway 198 in the cylinder head 178 communicates through a longitudinally disposed hole 200 in the tube 192 to the longitudinally disposed hole 118 in the plunger rod 110; and compressed air that is supplied to the passageway 198 flows upwardly to the parison plunger 116 and to the cooling passages 122 and 124 therein.

The reciprocating actuator 168 includes arcuately shaped passageways 202 which open through a top 204 of the cylinder cap 180. The arcuately shaped passageways 202 communicate with vertically disposed passageways 206 which extend downwardly and communicate with a manifold chamber 208.

As shown by phantom lines in FIG. 4, or as can be seen in FIG. 8, the guide body 50 is juxtaposed against the top 204 of the cylinder cap 180. Therefore, air being exhausted from the cooling passages 124 of the parison plunger 116 and flowing downwardly through the cooling holes 130 in the plunger head 112 continues downwardly through the air passages 158 in the flange 156, downwardly through the air passage 160 of the retaining plate 150, and into the arcuately shaped passageways 202.

Therefore, air being discharged from the parison plunger 116 communicates with the arcuately shaped passageways 202, flows downwardly through the vertically disposed passageways 206, into the manifold chamber 208, through a bore 210 of the cylinder head 178, and through a passageway 212 of a flanged jack tube 214 which is inserted into a counterbore 216 of the cylinder head 178 and which is retained therein by a retaining ring 218.

Referring now to FIG. 7, the temperature controlled valve 170 includes a valve body 220, attaching brackets 222 that are attached to the valve body 220 by bolts 224 and that are attached to the bottom 174 of the section box 166 by bolts 228, a tubular valve spool 230 that is slidably inserted into bores 232 of the valve body 220, an attaching plate 234 that is attached to the attaching brackets 222 by bolts 236, and a bimetal bellows 238.

The valve body 220 includes an upper housing 240 and an end plate 242; and a chamber partition 244 divides the valve body 220 into an inlet chamber 246 and a recirculation chamber 248.

The tubular valve spool 230 includes a tubular portion 250, a tubular passage 252 that is closed at opposite ends of the tubular portion 250 by a flanged end 254 and a plug portion 256, a plurality of entry passages 258 that are radially disposed and circumferentially spaced, and a plurality of exit passages 260 that are radially disposed and circumferentially spaced.

Continuing to refer to FIG. 7, the jacking conduit 172 includes the flanged jack tube 214, a jacking gear 262, and a base unit 264 that includes a flanged foot 266 and a base port 268. The flanged foot 266 is secured to the section box 166 by bolts 269; and the base port 268 communicates with a chamber 270 of the base unit 264.

The jacking gear 262 includes a flanged portion 272 having a plurality of gear teeth 274 and having a bearing face 276, and a bushing portion 278 having a threaded interior 280 that threadingly receives a threaded exterior 282 of the flanged jack tube 214.

Referring now to FIGS. 7 and 8, in operation, the flanged portion 272 of the jacking gear 262 is rotated by engagement of a worm (not shown) with the gear teeth 274. The bearing face 276 rotates on a face 284 of the base unit 264 so that engagement of the threaded exterior 282 with the threaded interior 280 is effective to raise the flanged jack tube 214 and the reciprocating actuator 168. In this manner, the reciprocating actuator 168 is juxtaposed against the guide body 50 of FIG. 1.

In operation, air being exhausted from the parison plunger 116 of FIG. 1, travels downward to the passageway 212 of the flanged jack tube 214, as previously described. Then the exhausted air flows downwardly into the chamber 270 of the base unit 264, out of the base port 268, through a flexible conduit 286 into the inlet chamber 246 of the temperature controlled valve 170, through the entry passages 258 of the tubular valve spool 230 through the tubular passage 252, and out of the tubular passage 252 by way of the exit passages 260.

When the temperature of the air in the section box 166 is too cold, the bimetal bellows 238 pulls the tubular valve spool 230 upwardly, communicating the exit passages 260 with the recirculation chamber 248. Then, air from the recirculation chamber 248 is communicated to a fan air inlet 288 in the bottom 174 of the section box 166 by a flexible conduit 290 and a flanged fitting 292, the flanged fitting 292 being secured to the bottom 174 of the section box 166 by bolts 294.

Thus, air discharged from the parison plunger 116 is mixed with and warms air that is supplied to the neck ring 26 and to the parison mold 22 via the fan air inlet 288 in accordance with selective control of the temperature controlled valve 170.

Conversely, when the temperature of the air in the section box 166 is too hot, the bimetal bellows 238 pushes the tubular valve spool 230 downwardly, communicating the exit passages 260 with a counterbore 296 in the bottom 174, and exhausting air from the parison plunger 116 to the atmosphere.

Referring now to FIG. 8, the glassware molding machine 164 includes a fan box or duct 298, an inlet conduit 300 that connects the fan box 298 to the section box 166, a fan 302 that is connected to the fan box 298, and an electric motor 304 that is drivingly connected to the fan 302.

In actual practice, the fan box 298 is much larger than shown; and six of the section boxes 166 are mounted onto the fan box 298 and receive fan air therefrom.

Further, in actual practice, the section box 166 may include two of the holes 173, as shown in FIG. 1, and a guide body 50 of another assembly, such as is shown in FIG. 1, is inserted through the additional hole 173 and is juxtaposed against the top 204 of the reciprocating actuator 168.

In order to better understand the apparatus and method of the present invention, and the claims appended hereto, the present invention provides a cooling system for the parison molding portion 20 of an individual section 162 of a glassware molding machine 164 of the type having a parison mold 22 that is disposed circumferentially around a parison axis 92, and having a neck ring 26 that cooperates with the parison mold 22 to form a parison (not shown).

The cooling system of the present invention includes a plurality of cooling holes 102 in the neck ring 26 that function as first cooling surface means for cooling the neck ring 26, and that each include both a first inlet 306 and a first outlet 308.

The upper receiver cap 34, the manifold 60, the air powered actuator 62, and the damper valve 64 are included in a means for supplying air from the section box 166 to the first inlets 306.

The cooling holes 104 in the parison mold 22 each include a second inlet 310 and a second outlet 312. The second inlets 310 are juxtaposed against the first outlets 308, as shown in FIG. 1, when the neck ring holder 28 places the neck ring 26 onto the upper receiver cap 34; so that the first outlets 308 are communicated to the second inlets 310. Thus, the cooling holes 104 of the parison mold 22, and the second inlets 310 thereof, are included in a means for exhausting air from the first outlets 308.

The parison plunger 116 includes plunger cooling passage means comprising the central cooling passage 122 and the plurality of radially disposed cooling passages 124; and this plunger cooling passage means includes a second inlet, or passage inlet, 314 to the central cooling passage 122 and a second outlet, or passage outlet, 316 from the radially disposed cooling passages 124. Further, the cooling system of the present invention includes means, comprising the longitudinally disposed hole 118 in the plunger rod 110 for supplying air to the plunger cooling passage means.

The guide body 50 serves as a passageway for supplying cooling air from the section box 166 to the first inlets 306 of the cooling holes 102 in the neck ring 26.

If the isolation sleeve 146 is omitted, then, air from the parison plunger 116 is communicated directly to the first inlets 306 of the cooling holes 102, and this direct communication serves as a means for utilizing air from the parison plunger 116 for supplying air to the first inlets 306.

However, in the preferred configuration, the isolation sleeve 146 serves as a means for isolating air discharged from the parison plunger 116 from air that is supplied to the cooling holes 102 of the neck ring 26 by the guide body 50; and then the means for utilizing the cooling air from the parison plunger 116 to supply cooling air to the neck ring 26 includes the isolation sleeve 146 and directing air from the parison plunger 116 to the section box 166 radially intermediate the plunger rod 110 and the isolation sleeve 146.

Further, in the preferred configuration, the temperature controlled valve 170 serves as a means for selectively communicating the air from the parison plunger 116 to the neck ring 26 via the section box 166.

In the preferred configuration, the bimetal bellows 238 serves both as a temperature sensor and as a valve actuator; and preferably, the temperature controlled valve 170 senses air temperature in the section box 166, as is seen by the location of the bimetal bellows 238 in the section box 166.

In summary, the present invention utilizes fan wind, as commonly supplied to individual sections of a glassware molding machine by a motorized fan, for cooling the neck rings and parison molds of the parison molding portion, thereby eliminating the need for, and the expense of, a source and a supply of compressed air.

While specific apparatus and method have been disclosed in the preceding description, it should be understood that these specifics have been given for the purpose of disclosing the principles of the present invention and that many variations thereof will become apparent to those who are versed in the art. Therefore, the scope of the present invention of to be determined by the appended claims.

Industrial Applicability

The present invention is applicable for cooling neck rings and parison molds of parison molding portions of individual sections of glassware molding machines.

What is claimed is:

1. A cooling system for a parison molding portion of an individual section of a glassware molding machine having a neck ring and a parison plunger that cooperate with a parison mold that is disposed circumferentially around the plunger axis to form a parison, said glasware molding machine being of the type having a section box for mounting said parison molding portion thereto and providing a substantially enclosed space within said section box, which cooling system comprises:

low pressure air providing means connected to said section box for maintaining substantially uncompressed air in said enclosed space of said section box;

guide body means secured to said section box and positioned to guide said parison plunger within said guide body means and along the parison plunger axis, said guide body means provided with a first passageway therethrough;

a receiver cap mounted to said guide body means and having a second passageway therethrough; and a neck ring associated with said receiver cap for engagement therewith, said neck ring a third passageway internally disposed within said neck ring and extending along its entire length, said first, second and third passageways being disposed substantially parallel to the plunger axis and communicating with each other to provide substantially vertical air flow for effectively cooling said parison molding portion with the low pressure air supplied therethrough from said section box.

2. A cooling system as claimed in claim 1 in which said system includes a parison mold associated with said neck ring for engagement therewith, said parison mold having a fourth passageway internally disposed within said parison mold and extending along its length, said fourth passageway being disposed substantially parallel to the plunger axis and communicating with the first, second and third passageways to provide substantially vertical air flow for effectively cooling said parison molding portion with the low pressure air supplied therethrough from said section box.

3. A cooling system as claimed in claim 1 in which said system includes a damper valve means disposed within said receiver cap for selectively controlling the low pressure air to said third passageway of said neck ring.

4. A cooling system as claimed in claim 1 in which said system includes a parison plunger associated with parison mold and having a channel therein comprising a plunger inlet and outlet and a connecting opening therebetween for cooling said parison plunger;
   means for supplying air to said plunger inlet;
   means for exhausting air from said parison outlet within said guide body means; and
   means for isolating said plunger outlet from said first passageway of said guide body means.

5. A cooling system as claimed in claim 4 in which said system further includes means for utilizing air exhausted from said plunger outlet for selectively supplying the exhausted air through said first and second passageways to said third passageway of said neck ring; and means for controlling the temperature of the air being supplied to the third passageway.

6. A cooling system for a parison molding portion of an individual section of a glassware molding machine having a neck ring and a parison plunger that cooperate with a parison mold that is disposed circumferentially around the plunger axis to form a parison, said glassware molding machine being of the type having a section box for mounting said parison molding portion thereto and providing a substantially enclosed space within said section box, which cooling system comprises:
   fan air furnishing means connected to said section box for supplying substantially low pressure air to said enclosed space within said section box;
   guide body means secured to said section box and positioned to guide said parison plunger within said guide body means and along the parison plunger axis, said guide body provided with a first passageway therethrough;
   a receiver cap mounted to said guide body means and having a second passageway therethrough;
   a neck ring associated with said receiver cap for engagement therewith, said neck ring having a third passageway internally disposed within said neck ring and extending along its entire length, said first, second and third passageways being disposed substantially parallel to the plunger axis and communicating with each other to provide substantially vertical air flow; and
   means for exhausting the air from said neck ring for effectively cooling said parison molding portion with the fan air supplied therethrough from the section box.

7. A cooling system for the parison molding portion of an individual section of a glassware molding machine of the type having a parison mold that is disposed circumferentially around a plunger axis, and having a neck ring and a parison plunger cooperate with said parison mold to form a parison, which cooling system comprises:
   a section box;
   motorized fan means, being operatively connected to said section box, for supplying low pressure air to said section box;
   a neck ring having a first cooling passage disposed in said neck ring, said first cooling passage disposed substantially parallel to the plunger axis;
   a parison mold having a second cooling passage disposed in said parison mold, said second cooling passage situated substantially parallel to the plunger axis and communicating with the first cooling passage; and
   means for supplying air from said section box to the first cooling passage and for exhausting air from the second cooling passage of said parison mold to provide substantially vertical air flow for effectively cooling said parison molding portion with low pressure air from said section box.

8. A cooling system for the parison molding portion of an individual section of a glassware molding machine of the type having parison mold that is disposed circumferentially around a plunger axis, and having a neck ring and a parison plunger that cooperate with said parison mold to form a parison, which cooling system comprises:
   a section box;
   motorized fan means, being operatively connected to said section box, for supplying low pressure air to said section box;
   a neck ring having a first cooling passage disposed in said neck ring and having first inlet and a first outlet, said first cooling passage disposed substantially vertical and parallel to the plunger axis;
   a parison mold having a second cooling passage disposed in said parison mold and situated substantially vertical and parallel to the plunger axis and communicating with the first cooling passage;
   a plunger cooling passage in said parison plunger for cooling said parison plunger;
   first means for supplying air from said section box to the first cooling passage of said neck ring and for exhausting air from second cooling passage;
   second means for supplying air to said plunger cooling passage and for exhausting air therefrom; and
   means for utilizing air from said second means for supplying air to said first means.

9. A cooling system for the parison molding portion of an individual section of a glassware molding machine of the type having a parison mold that is circumferentially around a plunger axis, and having a neck ring and a parison plunger that cooperate with said parison mold to form a parison, which cooling system comprises:
   a section box;
   low pressure air providing means operatively connected to said section box for supplying substantially uncompressed air;
   guide body means secured to said section box and positioned to guide said parison plunger within said guide body means and along the parison axis, said guide body means provided with a first passageway therethrough;
   a receiver cap mounted to said guide body means and having a second passageway therethrough, said cap having disposed therein a damper valve means for selectively controlling the cross-sectional dimension of the second passageway therein for adjusting the amount of air supplied therethrough; and a neck ring associated with said receiver cap for engagement therewith, said neck ring having a third passageway internally disposed within said neck ring and extending along its entire length, said first, second and third passageways disposed substantially parallel to the parison axis and communicating with each other to provide substantially vertical air flow for effectively cooling said parison molding portion with the low pressure air supplied therethrough from said section box.

10. A method of cooling a parison molding portion of an individual section of a glassware molding machine having a neck ring and a parison plunger that cooperate with a parison mold that is disposed circumferentially around the parison plunger axis to form a parison, said glassware molding machine being of the type having a section box for mounting said parison molding portion thereto and providing a substantially enclosed volume within said section box, which method comprises:

supplying low pressure air to said enclosed volume to provide substantially uncompressed air within said volume;

directing said low pressure air supplied to said enclosed volume through a first passageway positioned substantially vertically within a plunger guide body;

further directing said air substantially vertically through a second passageway within a receiver cap; and thereafter advancing the air substantially vertically through a third passageway defined by an internal opening disposed in a neck ring and extending along the entire length of said neck ring for effectively cooling said parison molding portion by said low pressure air from said enclosed volume.

11. A method of cooling as recited in claim 10 in which the low pressure air directed through said second and third passageways includes the step of selectively controlling the air flow during its advance into said third passageway.

12. A method of cooling as recited in claim 10 in which said method further comprises the step of directing the low pressure air from the third passageway to a fourth passageway located within a parison mold and disposed substantially parallel to the plunger axis to provide substantially vertical air flow for effectively cooling said parison molding portion by said low pressure air.

13. A method of cooling as recited in claim 10 in which the low pressure air being directed through said third passageway includes the step of isolating said directed low pressure air from the cooling air exhaust from said parison plunger.

14. A method of cooling as recited in claim 13 in which said step of supplying low pressure air to said section box includes mixing the exhausted air from said parison plunger with the air of said section box to provide a predetermined temperature for the air being directed through first, second and third passageways.

* * * * *